(12) United States Patent
Corr et al.

(10) Patent No.: US 11,845,099 B2
(45) Date of Patent: Dec. 19, 2023

(54) INTEGRATED ELECTROSPRAY EMITTER AND METHODS FOR MAKING SAME

(71) Applicants: DH Technologies Development Pte. Ltd., Singapore (SG); Trajan Scientific Australia Pty Ltd, Ringwood (AU)

(72) Inventors: John J. Corr, Richmond Hill (CA); Thomas Covey, Richmond Hill (CA); Peter Kovarik, Markham (CA); Michael Bailey, Gig Harbor, WA (US); Brett Barnett, Victoria (AU)

(73) Assignee: DH Technologies Development Pte. Ltd., Singapore (SG)

( * ) Notice: Subject to any disclaimer, the term of this patent is extended or adjusted under 35 U.S.C. 154(b) by 750 days.

(21) Appl. No.: 16/977,210

(22) PCT Filed: Mar. 1, 2019

(86) PCT No.: PCT/IB2019/051684
§ 371 (c)(1),
(2) Date: Sep. 1, 2020

(87) PCT Pub. No.: WO2019/167025
PCT Pub. Date: Sep. 6, 2019

(65) Prior Publication Data
US 2021/0008575 A1    Jan. 14, 2021

Related U.S. Application Data

(60) Provisional application No. 62/811,759, filed on Feb. 28, 2019, provisional application No. 62/636,909, filed on Mar. 1, 2018.

(51) Int. Cl.
*B05B 5/03* (2006.01)
*G01N 30/72* (2006.01)
(Continued)

(52) U.S. Cl.
CPC ............ *B05B 5/03* (2013.01); *G01N 30/7266* (2013.01); *H01J 49/165* (2013.01); *H01J 49/167* (2013.01); *G01N 2030/027* (2013.01)

(58) Field of Classification Search
CPC .................. B05B 5/03; G01N 30/7266; G01N 2030/027; H01J 49/165; H01J 49/167
(Continued)

(56) References Cited

U.S. PATENT DOCUMENTS

| 4,458,346 A | 7/1984 | Mitsuyu et al. |
| 5,614,154 A | 3/1997 | Glatz et al. |

(Continued)

FOREIGN PATENT DOCUMENTS

WO        0150820 A1    7/2001

OTHER PUBLICATIONS

International Search Report and Written Opinion for PCT/IB2019/051684 dated Jun. 26, 2019.

*Primary Examiner* — Nicole M Ippolito

(57) ABSTRACT

An electrospray ionization emitter according to various aspects described herein can include an emitter body formed using fused silica. The emitter body can comprise a fluid conduit segment that includes a liquid connection end that has been coated with polyetheretherketone (PEEK) on at least one portion thereof. The liquid connection end can have a first outer diameter that is configured to be connected to a sample source to receive a sample liquid for ionization therefrom. The emitter body can further comprise an ionization discharge segment that is fluidly connected to the fluid conduit segment. The ionization discharge segment can have an ionization discharge end that is coated with a conductive material on at least one portion thereof and configured to have a second outer diameter that allows ionization of the liquid sample.

24 Claims, 6 Drawing Sheets

(51) Int. Cl.
*H01J 49/16* (2006.01)
*G01N 30/02* (2006.01)

(58) Field of Classification Search
USPC .......................................................... 250/288
See application file for complete search history.

(56) References Cited

U.S. PATENT DOCUMENTS

| | | |
|---|---|---|
| 2007/0267293 A1 | 11/2007 | Finch et al. |
| 2012/0223225 A1* | 9/2012 | Russell .............. G01N 30/7266 250/288 |
| 2013/0126021 A1* | 5/2013 | Hobbs ................ B01D 15/1871 137/557 |
| 2014/0158599 A1 | 6/2014 | Michienze |
| 2022/0328300 A1* | 10/2022 | Valaskovic ........... H01J 49/167 |

* cited by examiner

INTEGRATED ELECTROSPRAY EMITTER AND METHODS FOR MAKING SAME

RELATED APPLICATIONS

This application claims priority to U.S. provisional application No. 62/636,909 filed on Mar. 1, 2018, entitled "Integrated Electrospray Emitter and Methods for Making Same," which is incorporated herein by reference in its entirety and to U.S. provisional application No. 62/811,759 filed on Feb. 28, 2019, entitled "Integrated Electrospray Emitter and Methods for Making Same," which is incorporated herein by reference in its entirety.

FIELD

The present invention relates generally to an electrospray emitter, and more particularly, to an integrated electrospray emitter having an ionization discharge end and a fluid connection end.

BACKGROUND

Mass spectrometry (MS) is an analytical technique for measuring the mass-to-charge ratios of molecules within a sample, with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Mass spectrometers detect chemical entities as ions such that a conversion of the analytes to charged ions must occur during the sampling process. Due to the accuracy and sensitivity requirements for most MS applications, complex samples are generally subjected to separation techniques prior to ionization.

Over the years, various sampling techniques have been developed to convert the chemical entities within a liquid sample into charged ions suitable for detection with MS. One of the more common ionization methods is electrospray ionization (ESI) (e.g., pneumatically assisted electrospray, nano-electrospray), due to its ability to perform functions such as transfer molecules, including large macromolecules, from solution into the gas-phase as intact multiply-charged molecular ions and the ease with which it can be coupled to various sample sources including liquid chromatography and capillary electrophoresis.

A typical electrospray emission process can occur when an electrostatic force on a surface of a liquid sample overcomes surface tension. Specifically, in a typical ESI process, a liquid sample is discharged into an ionization chamber via an electrically conductive needle, electrospray electrode, or nozzle, while an electric potential difference between the electrospray electrode and a counter electrode generates a strong electric field within the ionization chamber that electrically charges the liquid sample. This can result in formation of a Taylor cone at or near an emitter tip of the electrospray electrode. A liquid jet can then be emitted from the apex of the Taylor cone. Specifically, the electric field generated within the ionization chamber causes the liquid discharged from the electrospray electrode, needle or nozzle to disperse into a plurality of charged micro-droplets drawn toward the counter electrode if the charge imposed on the liquid's surface is strong enough to overcome the surface tension of the liquid (i.e., the particles attempt to disperse the charge and return to a lower energy state). As solvent within the micro-droplets evaporates during desolvation in the ionization chamber, charged analyte ions can then enter a sampling orifice of the counter electrode for subsequent mass spectrometric analysis.

Accordingly, the electrospray process often requires generation of high electric fields at the emitter tip of the electrospray electrode. This requirement along with surface tension considerations within the Taylor cone often demand electrospray electrode emitter tips that have small inside diameters (ID). In conventional ESI, the electrospray electrode is traditionally comprised of a metallic capillary (e.g., stainless steel) from which the liquid sample is discharged into the ionization chamber and to which a voltage of several kilovolts is applied relative to the counter electrode. As ESI-based techniques have increasingly emphasized ionization efficiency and/or reduced sample consumption (e.g., by reducing the size of the sample needle to decrease volumetric flow rates of the liquid sample), manufacturing constraints on the size of metallic capillaries have led to the use of metallized silica capillaries. For example, silica capillaries can be produced with relatively smaller inner diameters (IDs), which can then be coated with a thin layer of conductive material (e.g., gold). Whereas it is generally difficult to produce a stainless steel capillary having an ID less than about 70 µm, metallized silica capillaries can exhibit IDs as low as 5 µm, by way of non-limiting example.

Further, the inlet end of the electrospray electrode also requires a practical connection to a source (e.g., reservoir) containing the liquid sample that is being electro-sprayed. Such liquid connections often require outside diameters (OD) that are larger (e.g., two to ten times larger) than outside diameters of the emitter tip. This difference between the outside diameters of the liquid connection and the emitter is often addressed in the art by using a reducing union or a sleeve and a union. However, the addition of the sleeve and the union can complicate the process of implementing and/or connecting the various portions of the electrode. For example, in order to properly utilize a union, the user would have to adjust the position of the union until a specific length (e.g., 0.5 mm to 1 mm) of the emitter tip protrudes from the sprayer head. Further, in some cases, the union can be connected such that it offers an electrical isolation of the emitter tip from the user-handled liquid chromatography (LC) connection. Such requirements can further complicate the implementation and connection of an electrospray emitter.

SUMMARY

An integrated, monolithic (permanently attached), easy-to-use electrospray emitter having an ionization discharge end and a fluid connection end is described herein. In some aspects, the integrated electrospray emitter can have an ionization discharge end comprising a material such as fused silica and a fluid connection end comprising fused silica coated by a material such as polyetheretherketone (PEEK).

In one aspect, an electrospray ionization emitter is disclosed. The electrospray ionization emitter can comprise an emitter body comprising of fused silica. The emitter body can comprise a fluid or liquid conduit segment having a liquid connection end. The liquid connection end can be coated with polyetheretherketone (PEEK) on at least one portion thereof and can have a first outer diameter configured for connecting to a sample source (e.g., a liquid chromatography (LC) column) and receiving a sample liquid for ionization therefrom. In another aspect, the liquid conduit segment can be made with only PEEK. The emitter body can further comprise an ionization discharge segment that is fluidly connected to the fluid conduit segment. The ionization discharge segment can have an ionization discharge end. At least a portion of the ionization discharge end can be coated with a conductive material on at least one portion thereof and can exhibit a second outer diameter configured to allow ionization of the liquid sample. The second outer diameter can be smaller than the first outer diameter.

In accordance with various aspects of the present teachings, a method for manufacturing an electrospray ionization emitter is provided. The manufacturing method can include connecting a fluid conduit segment, having a liquid connection end, to an ionization discharge segment, having an ionization discharge end, to form a body for the emitter. The emitter body can comprise fused silica. The manufacturing method can further comprise coating the liquid connection end with polyetheretherketone (PEEK) on at least one portion thereof to form a first outer diameter at the liquid connection end that allows the liquid connection end to be connected to a sample source (e.g., a LC column) to receive a sample liquid for ionization therefrom. The manufacturing method can also comprise coating at least a portion of the ionization discharge end of the ionization discharge segment with a conductive material such that the ionization discharge end includes a second outer diameter configured to allow ionization of the liquid sample. By way of non-limiting example, the conductive coating can be metal applied via a solution (e.g., an electroplating process), by chemical vapor deposition (e.g., evaporative deposition), and/or physical deposition (e.g., coating, sputter coating). In some aspects, the metal coating can include one or more layers of different metals to enhance bonding characteristics to the substrate (i.e., titanium for fused silica), while the outer layer can be chosen for its chemical and physical properties. Metals such as platinum, iridium, and tungsten and combinations thereof (alloys) can help reduce discharge erosion. Metals such as gold and platinum can also offer superior chemical inertness.

In other examples, any of the aspects above, or any system, method, apparatus described herein can include one or more of the following features.

In various aspects, at least a portion of the fluid conduit segment can comprise a reinforcement coating. The reinforcement coating can be configured to facilitate coating of the at least one portion of the fluid conduit segment with PEEK. In some exemplary aspects, the reinforcement coating can comprise polyimide.

In certain aspects, the ionization discharge end can be configured to allow electrostatic field effect. By way of non-limiting example, the ionization discharge end can be shaped to control the electric field. Additionally or alternatively, the conductive coating can be applied selectively to enhance a formation of an electric field particular to an ion generating application. The ionization discharge end can comprise a pretreated surface. The pretreated surface can be configured to improve coating of the ionization discharge end with the conductive material. Further, the ionization discharge end can be subjected to ion bombardment by at least one of Argon, Oxygen, or Neon ions to form the pretreated surface.

Additionally or alternatively, the emitter body can include at least one permanently deformable and/or non-deformable mechanical connection that connects the fluid conduit segment and the ionization discharge segment. The mechanical connection can be established using at least one of a clamp, a ferrule, crimping or any other suitable means. Further, in some aspects, the mechanical connection can be configured such that it can be movable about the fluid conduit segment and the ionization discharge segment to allow for making positioning adjustments to the emitter body prior to electrode assembly.

Further, the emitter body can include an insulating material on at least a portion of the fluid conduit segment to allow for handling of the emitter by a user. In various embodiments, the insulating material can be electrical insulating material. A locating ring can be included in the body of the emitter to indicate the insulated portion of the fluid conduit segment to the user and/or to help ensure accurate placement within an ion source housing. If the emitter is a part of a pneumatically assisted electrospray, the locating ring can ensure proper and accurate location of the ionization discharge end with respect to the nebulizing gas nozzle. The locating ring can also provide means to seal the nebulizing gas within the gas channel. In various aspects, a deformable O-ring can provide a nebulizing gas seal for pneumatically assisted electrospray operation.

Other aspects and advantages of the invention can become apparent from the following drawings and description, all of which illustrate the principles of the invention, by way of example only.

BRIEF DESCRIPTION OF THE DRAWINGS

Features and advantages of the invention described herein, together with further advantages, may be better understood by referring to the following description taken in conjunction with the accompanying drawings. The drawings are not necessarily to scale, emphasis instead is generally placed upon illustrating the principles of the invention. A skilled person in the art will understand that the drawings, described below, are for illustration purposes only. The drawings are not intended to limit the scope of the applicant's teachings in any way.

DETAILED DESCRIPTION

Figure 1:
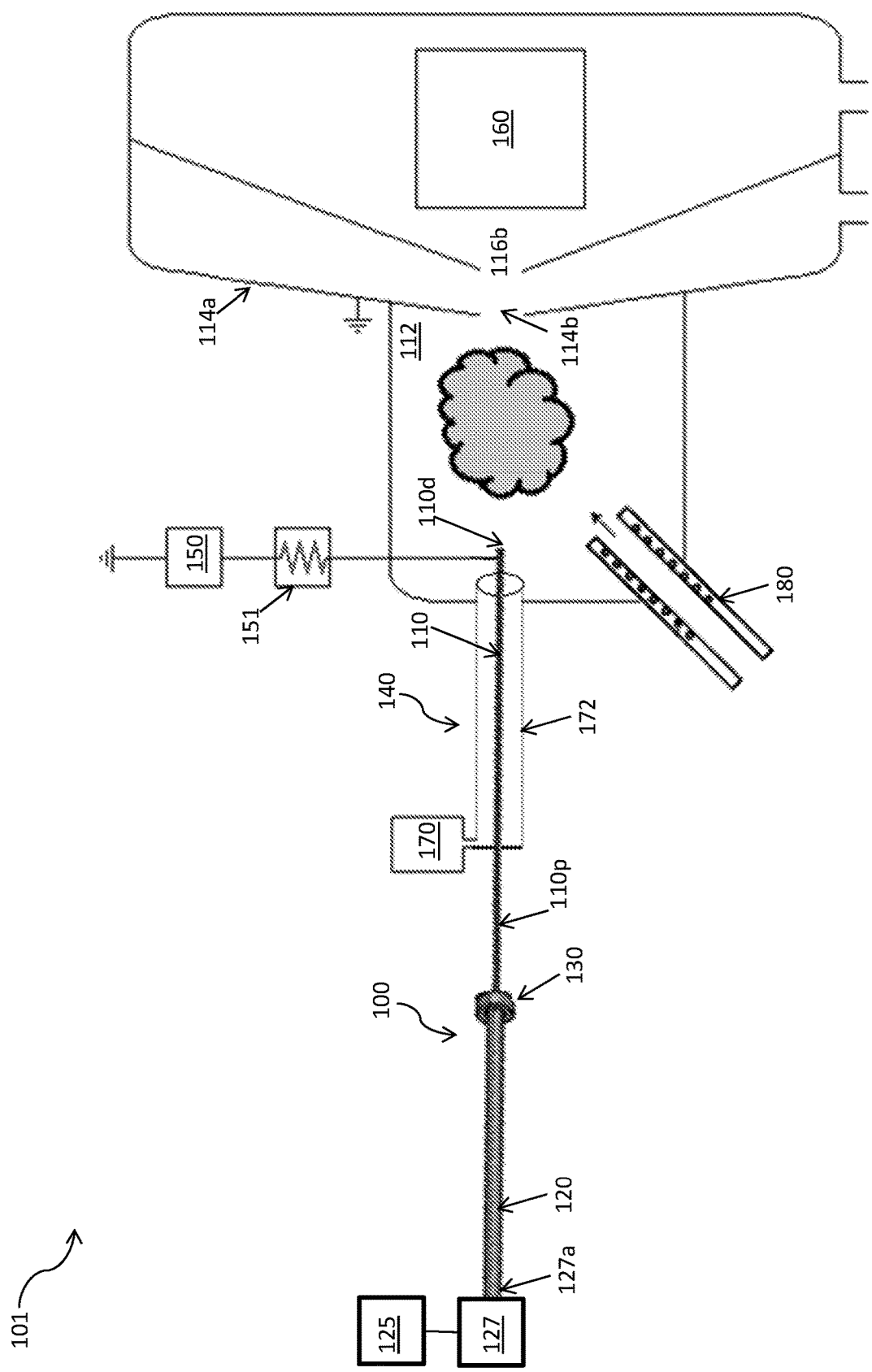
FIG. 1 is a schematic illustration of an electrospray emitter according to various aspects of the applicant's teachings.

The present disclosure relates to an integrated easy-to-use, electrospray emitter having an ionization discharge end and a fluid connection end. In various aspects, the integrated electrospray emitter can have an ionization discharge end comprising a material such as fused silica and a fluid connection end comprising a liquid conduit comprising fused silica that is coated in a material such as polyetheretherketone (PEEK).

In various aspects, electrospray emitters in accordance with the present teachings can allow for the direct coupling of a chromatographic column, thereby eliminating intermediate tubing and connectors that can be difficult and/or tedious to connect to known electrospray emitters. Additionally or alternatively, the direct coupling can solve the problem of chromatographic dead volumes that can occur over a flow rate dynamic range of over 10,000, i.e., from about 100 nL/min to about 2 mL/min. Further, an electrospray emitter according to the various aspects disclosed herein can allow a complete novice to mass spectrometry or liquid chromatography to more easily connect a column to the emitter with high success rate (e.g., a 100% success rate) without requiring the person to have any substantial training or instruction in connecting emitters.

In various aspects, the emitter according to the present teachings can include an integrated, one-piece (monolithic) electrode. The emitter can include an ionization discharge segment and a fluid conduit segment. For example, the ionization discharge segment can comprise fused silica and the fluid connection segment can have a fluid connection end that comprises fused silica that has been coated with an outer layer of PEEK polymer in at least one portion thereof. The fused silica ionization discharge segment can be configured such that it is in direct contact with the conduit segment.

An electrospray ionization (ESI) mass spectrometry (MS) emitter according to various aspects described herein can offer superior properties over currently available fused silica emitters. Specifically, by integrating fused silica with a PEEK polymer, an integrated emitter according to various aspects of the present teachings can be capable of generating ions with high efficiency across a flow dynamic range of about four orders of magnitude (e.g., across about 10,000 nL/min) and a chromatographic connection capable of zero peak dispersion across a flow range from about 100 nL/min to about 2 mL/min, by way of non-limiting example. Further, by combining the fused silica and PEEK polymer into a single-piece emitter, integrated emitters according to various aspects described herein can serve as an easy-to-use option for those less experienced in the field of mass spectrometry, for example, by reducing the steps (and the difficulty thereof) required to fluidly couple the emitter to a sample source (e.g., a LC column). In contrast, presently available silica ESI emitters can neither provide similar performance (e.g., over a similar flow range) nor can such emitters be as easily used by those novice to the field of mass spectrometry. Additionally, integrated electrodes according to the present teachings can offer additional flexibility by allowing maximum ionization at any flow rate (given that an appropriate electrode is used) and also better performance (e.g., by reducing or eliminating chromatic band broadening).

An ESI emitter according to various aspects of the present teachings can provide an integral ESI electrode that combines a practical liquid connection at its inlet with a high-performance emitter tip to form a single monolithic (i.e., indivisible) device. In some aspects, the ESI emitter can comprise a fused silica conduit (e.g., capillary) that is at least partially surrounded by PEEK. For example, the fluid connection end can include a small outer diameter (OD) fused silica (e.g., coated with a thin layer of polyimide) that can be clad in a material, such as PEEK polymer, to form a practical (e.g., larger) outer diameter for receiving the fluid from the sample source that is to be discharged into the ionization chamber. Specifically, ESI electrodes in accordance with various exemplary aspects of the present teachings can include an emitter discharge tip comprising fused silica (e.g., consisting of only fused silica) and having a surface that is enhanced for local electrical conductivity (e.g., via a metalized discharge end). Exemplary ESI electrodes can further include, at its liquid connection end, fused silica coated by a material such as PEEK for enabling a fluid connection to the sample source. In various aspects, this configuration can simplify the efforts required for implementing the emitter, as it removes the need for a user to address the differences in the outer diameters of the emitter tip and the liquid connection, which typically requires the connection of multiple conduits and connectors to provide an appropriate reduction in inner diameters of the liquid conduits extending from the sample source to the discharge end. Further, the high electrical resistance of the PEEK, polyimide, and fused silica can offer the necessary electrical isolation for insulating the user handled LC end of the ESI electrode.

FIG. 1 is a schematic illustration of an electrospray emitter 100 according to some aspects disclosed herein. As shown, the electrospray emitter 100 can be used in a mass spectrometer system 101. The electrospray emitter 100 can include an ionization segment 110, having an ionization discharge end 110$d$, and a liquid conduit 120 having a fluid connection end 127$a$. In some aspects, the ionization segment 110 can comprise fused silica (e.g., only fused silica) and the liquid conduit segment 120 can comprise fused silica coated with a layer of a polymer, such as PEEK. The ionization segment 110 can be in direct contact with the liquid conduit segment 120.

The example mass spectrometer system 101 can include a sample source 125 that provides a fluid sample to be ionized, an ion source 140, and a mass analyzer 160 for the downstream processing of sample ions. For example, the sample source 125 can include and/or be connected to a liquid chromatography column 127. As shown in FIG. 1, the electrospray emitter 100 provides a flow path that connects the liquid chromatography column 127 to the ion source 140.

Generally, the mass spectrometer system 101 can be fluidly coupled to a variety of liquid sample sources and configured to receive a liquid sample from the sample sources. By way of non-limiting example, the sample source 125 can comprise a reservoir (not shown) of the sample to be analyzed or an input port (not shown) through which the sample can be injected (e.g., manually or via an autosampler), infused, or input via chemical electrophoresis capillary. Alternatively or additionally, also by way of non-limiting example, the sample source 125 can be connected to and/or include an LC column (e.g., of a high-performance liquid chromatography (HPLC) system) such that the liquid sample to be analyzed can be in the form of an LC eluent. In the example shown in FIG. 1, the LC column 127 is fluidly coupled to the ion source 140 and configured such that one or more LC pumps (not shown) can deliver the eluent from the output end of the LC column 127 to the fluid connection end 127$a$, through the electrospray emitter 100, to the input end/proximal end 110$p$ of the ionizing discharge segment 110. The emitter 100 can provide a channel (not shown), through which fluid can be transmitted from the fluid connection 127$a$, in fluid connection with the output end of the LC column 127, through the liquid conduit 120 and ionization discharge 110 segments of the emitter 100, to the discharge end 110$d$ of the ionization discharge segment 110.

The emitter 100 can be made from any suitable material known in the art. For example, the emitter 100 can comprise a permanently formed fused silica channel. The permanently formed fused silica emitter 100 can be a single fused silica tube or be formed from one or more independent portions that have been integrated into a single piece emitter. In some aspects, the emitter 100 can comprise a material, such as a small OD silica, which is clad, on the liquid conduit segment 120 in a material, such as PEEK polymer. The PEEK polymer, at the liquid conduit segment 120 can provide the practical outer diameter that is typically needed for forming a fluid connection 127a to the LC column 127 eliminating the need for a sleeve or adapter to make the connection. The emitter 100 can include, on at least a portion of the liquid conduit segment 120, a material that facilitates the coating of the liquid conduit segment 120 with the PEEK polymer. For example, a fused silica fluid conduit can comprise a reinforcing coating that allows the coating of the fused silica to be further coated with a material such as PEEK. The reinforcing coating can comprise any suitable material available in the art. For example, the reinforcing coating can be polyimide.

On the ionization discharge side 110, the emitter 100 can have an emitter discharge tip 110d that is made from a material, such as fused silica, and enhanced for local electrical conductivity to electrically charge the liquid and generation of an electric field. Therefore, the emitter 100 can provide a fluid connection that connects the LC column 127 to the ion source 140, while removing the need for a user to address the required OD difference for connecting to the LC column 127 and the ion source 140. By way of non-limiting example, the emitter discharge tip 110d can include a conductive coating (e.g., a metal) that is applied via an electroplating process, by chemical vapor deposition (e.g., evaporative deposition), and/or physical deposition (e.g., coating, sputter coating). In some aspects, the metal coating can include one or more layers of different metals to enhance bonding characteristics to the substrate (i.e., titanium for fused silica), while the outer layer can be chosen for its chemical and physical properties. Metals such as platinum, iridium, and tungsten and combinations thereof (alloys) can help reduce erosion of the tip 110d during discharge. Metals such as gold and platinum can also offer superior chemical inertness. Additionally, in some aspects, the ionization discharge end can be pretreated so as to improve coating with the conductive material (e.g., via ion bombardment by at least one of Argon, Oxygen, or Neon ions to form the pretreated surface). In various aspects, the conductive coating can also be applied selectively to enhance a formation of an electric field particular to an ion generating application and/or the discharge end can be shaped to control the electric field.

Referring back to FIG. 1, the ion source 140 can generally comprise an electrospray ion source that includes at least a portion of the ionization discharge segment 110 of the electrospray emitter 100. For example, as noted above, the ionization discharge segment 110 can terminate in a discharge tip 110d that is configured to spray the liquid sample into a heated ionization chamber 112 heated by heater 180. The heated ionization chamber 112 can be in fluid communication with the sampling orifice 114b of a curtain plate 114a and the entrance orifice 116b of the mass analyzer 160.

As shown, the mass spectrometer 101 can additionally include a power source 150. The power source 150 can be configured to provide an electrical power to an electrical circuit 151 that contains the ionization discharge end 110d of electrospray emitter 100. The electrical power can ionize the molecules within the liquid sample (e.g., analytes of interest) as the liquid sample is discharged (e.g., sprayed) into the ionization chamber 112. Additionally, the mass spectrometer system 101 can include one or more ion emission current mechanisms (not shown) for preventing the onset of unwanted electrical discharge between the ionization discharge end 110d and the curtain plate 114a.

The mass spectrometer system 101 can also include a source of gas 170 that is channeled through gas conduit 172 to provide means for pneumatically assisted electrospray or spray.

Further, as shown in FIG. 1, in some aspects, the emitter 100 can include a locating ring 130. The locating ring 130 can be used to identify the insulated portion of the emitter 100 and can help ensure accurate placement within an ion source housing and (if present) gas conduit 172. In various embodiments, the locating ring can be part of a ferrule or be a separate ferrule. Specifically, as noted above, the liquid conduit segment 120 of the emitter 100 can be clad in an insulating material (e.g., PEEK polymer). Since this segment 120 of the emitter 100 can be in direct contact with a user (e.g., a user's hand), the locating ring 130 can be used to mark the ending of the insulated segment 120 to prevent the user from accidentally coming in contact with the conductive segment (i.e., ionizing segment 110) of the emitter 100. In addition, the length of the emitter 100 distal to the locating ring 130 can be selected to extend an appropriate distance into the ionization chamber 112 and (if present) into gas conduit 172. In such manners, when the emitter 100 is coupled to the ion source housing, the locating ring 130 can be disposed against a shoulder of the housing to help provide accurate placement of the emitter 100 therein.

Figure 2A:
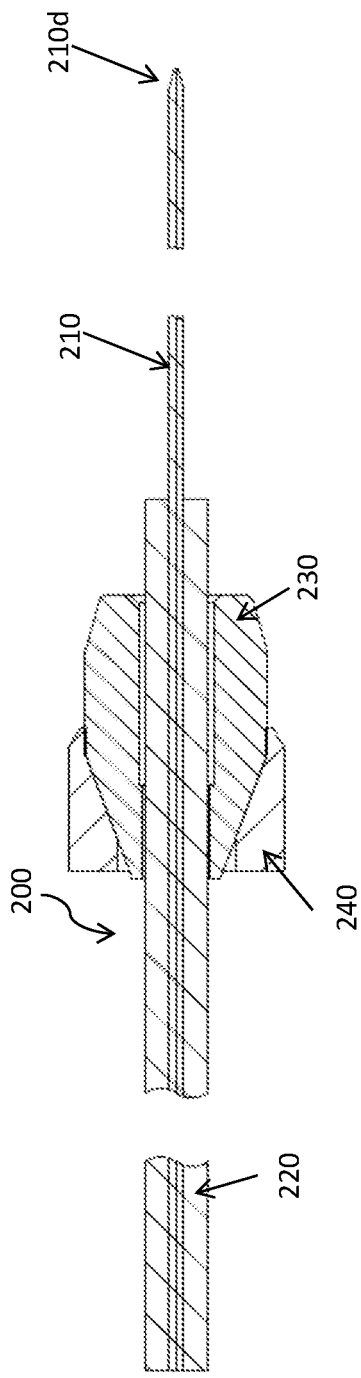
FIG. 2A is an example illustration of a one-piece electrospray emitter according to various aspects of the applicant's teachings.

FIG. 2A is an example illustration of a one-piece electrospray emitter 200 according to various aspects of the present teachings. As shown in FIG. 2A, the one-piece electrospray emitter 200 can comprise one continuous piece of any suitable material, such as fused silica tubing. An insulating polymer, such as PEEK polymer, can be molded or extruded onto the fluid 220 of the emitter 200. The molding or extrusion of PEEK onto the fused silica can form a liquid connection end for connecting to the LC column (e.g., LC column 127 in FIG. 1). The fused silica tubing can provide, on the ionizing side 210, the necessary ID for achieving electrospray of the sample. The insulating polymer molded or extruded onto fused silica can also provide, on the liquid conduit segment 220, the required OD for connecting to an LC column and receiving the fluid sample. For example, in one embodiment, the liquid conduit segment can comprise a tube having an outer diameter (OD) of about 1/32 or 1/16 inches for connecting to an LC column.

Further, as noted with reference to FIG. 1, a locating ring 230 can be used to identify the insulated portion of the emitter 200 and to ensure proper placement of the emitter 200 with the ion source housing. Specifically, since the insulated liquid conduit segment 220 of the emitter 200 can be in direct contact with a user (e.g., a user's hand), the locating ring 230 can be used to mark the ending of the insulated segment 220 to prevent the user from accidentally coming in contact with the conductive portion (i.e., the ionization tip 210d) of the emitter 200. In various embodiments, the emitter 200 can include a ring cap 240.

Figure 2B:
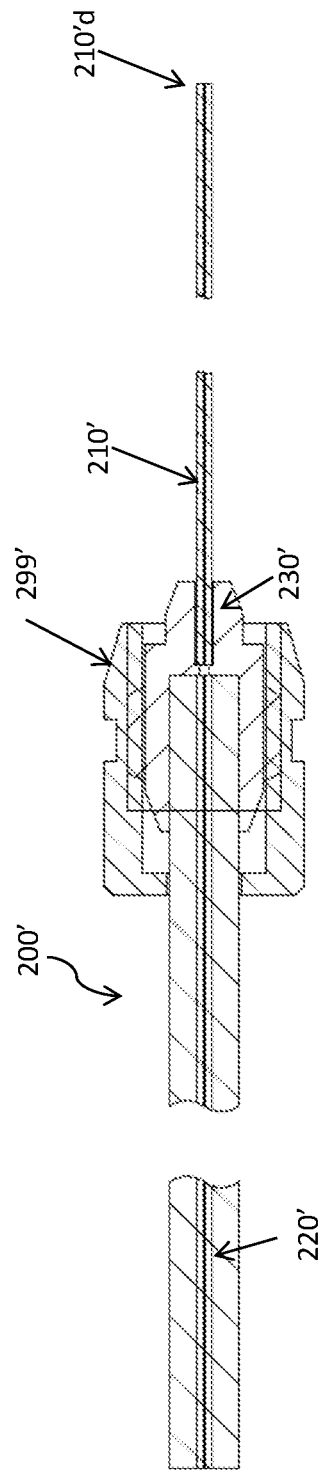
FIG. 2B is an example illustration of a multi-piece electrospray emitter according to various aspects of the applicant's teachings.

Although demonstrated as a single-piece electrospray emitter in FIGS. 1-2A, a spray emitter according to various aspects provided herein can comprise two or more pieces that have been connected to form an integrated electrospray emitter. FIG. 2B is an example illustration of a multi-piece electrospray emitter 200' according to some embodiments disclosed herein. In the example shown in FIG. 2B, the emitter 200' comprises two pieces 210', 220' that have been connected to form an integrated (monolithic) emitter 200'. Specifically, as shown in FIG. 2B, the emitter 200' can include an ionization discharge segment 210' and a liquid conduit segment 220'. The ionization discharge segment 210' can comprise any suitable material available in the art. For example, the ionization discharge segment 210' can be a sprayer tube that comprises a material such as fused silica or stainless steel. The liquid conduit segment 220' can also comprise any suitable material known in the art. For example, the liquid conduit segment 220' can include an internal portion formed from a material such as fused silica that has been coated with one or more pieces of a material such as a polymer (e.g., PEEK polymer) and/or be formed of other suitable materials, such as PEEK.

The liquid conduit segment 220' and the ionization discharge segment 210' can be connected to form the integrated (monolithic) electrospray emitter 200'. Generally, any suitable means available in the art can be used to connect the liquid conduit segment 220' and the ionization discharge segment 210'. For example, as shown in FIG. 2B, any of a ferrule, a ring, or a cap 299' can be used to connect the liquid conduit segment 220' to the ionization discharge segment 210'. As noted with reference with FIG. 2A, the liquid conduit segment 220' can include an electrically insulating layer that allows a user to directly interact and/or handle the emitter 200'. A locating ring 230' can be used to identify this insulated portion 220' of the emitter 200' to prevent the user from accidentally coming into contact with the conductive portion (i.e., discharge end 210'd) of the emitter 200'. In some aspects, the length of the emitter 200' distal to the locating ring 230' can be selected to extend an appropriate distance into the ionization chamber 112 (as shown in FIG. 1).

Figure 3:
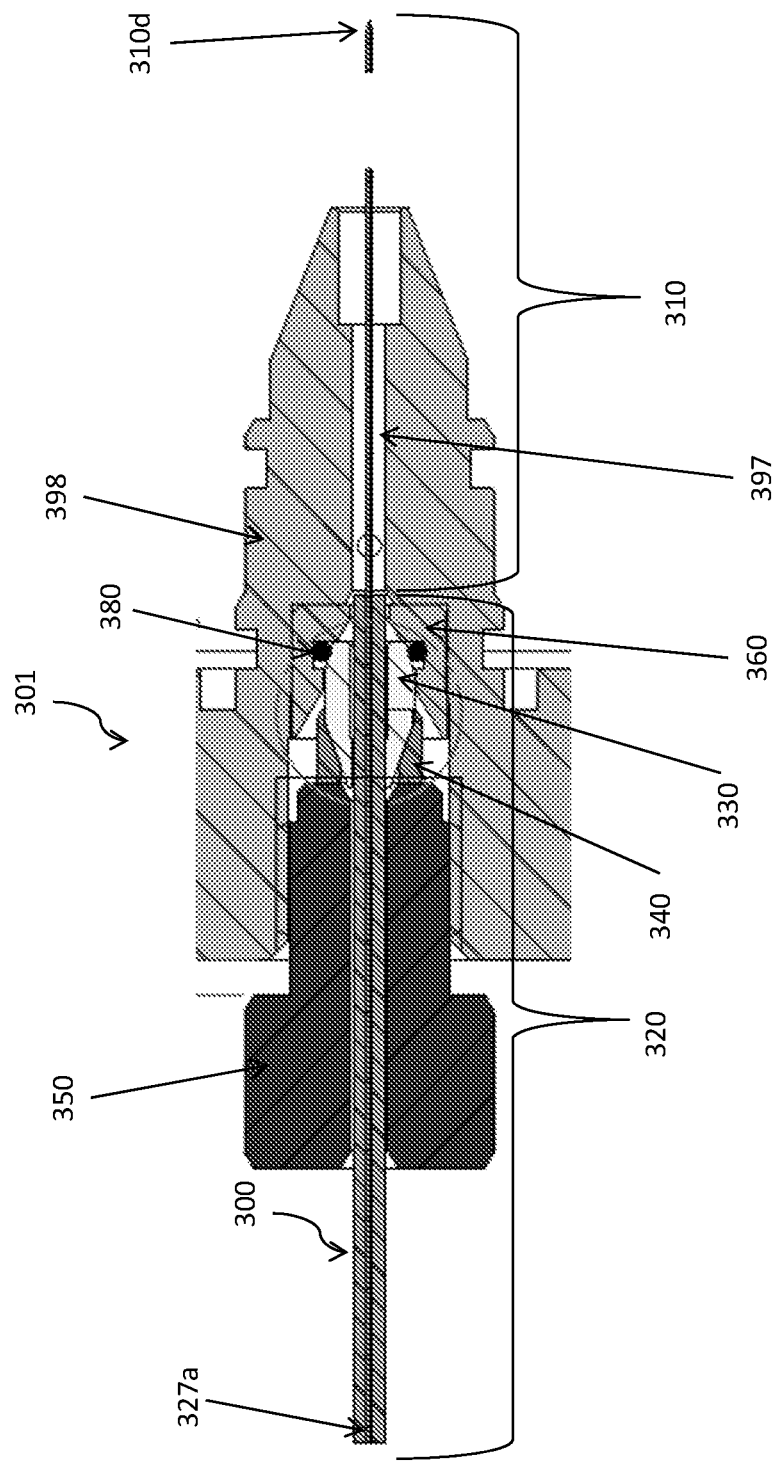
FIG. 3 is a cross-sectional schematic illustration of a probe that can be used for a one-piece electrode electrospray ionization (ESI) according to various aspects of the applicant's teachings.

FIG. 3 is a cross-sectional schematic illustration of a probe 301 that can be used for electrospray ionization (ESI) according to some embodiments disclosed herein. The probe 301 can be any suitable probe available in the relevant art for performing sample ionization. For example, the probe 301 can be an electrospray ionization (ESI) probe.

The probe 301 can include a probe body 398 having a channel 397 extending therethrough through which an emitter 300 can be installed. As discussed above, a one-piece electrode emitter 300 also provides a channel (e.g., a microchannel) that extends from an entrance end 327a (fluid connection end) to an ionization discharge end 310d, and out of the probe body 398 of the probe 301. The emitter 300 comprises an ionization segment 310 and a liquid conduit segment 320 formed using any suitable material, such as fused silica tubing or stainless steel. An insulating polymer, such as PEEK polymer, can be molded or extruded onto the liquid conduit segment 320 of the emitter 300. As noted above, the molding or extruding of the polymer onto the fused silica can be used to form a liquid connection to an LC column. The emitter 300 contains an axially depth location feature, the locating ring 330, which enables the user to install the emitter tip accurately and simply. Locating ring 330 can be secured into place with the locating nut 350 as shown in FIG. 3 which aligns the emitter into place on the locating ferrule seat 360 without the need for any further adjustment by the user. The emitter can include a ring cap 340. O-ring 380 seals the locating ring 330 within the ferrule seat 360 preventing any assisting gas flow from moving back up the emitter probe body.

The molded or extruded PEEK covered fused silica can provide, on the liquid conduit segment 320, the practical OD for connecting to the LC column and receiving the fluid sample. For example, in one aspect, the liquid conduit segment can provide a tube having an outer diameter (OD) of about 1/32 or 1/16 inches or in a range from about 150 μm to about 1.6 mm for connecting to the LC column at an entrance end 327a of the emitter 300. The fused silica or stainless steel tubing can also provide, on the ionization discharge side 310d, the necessary ID for achieving the electrospray of the sample. The ID at the ionization discharge end 310d can be, for example, from about 10 μm to about 500 μm.

Figure 4:
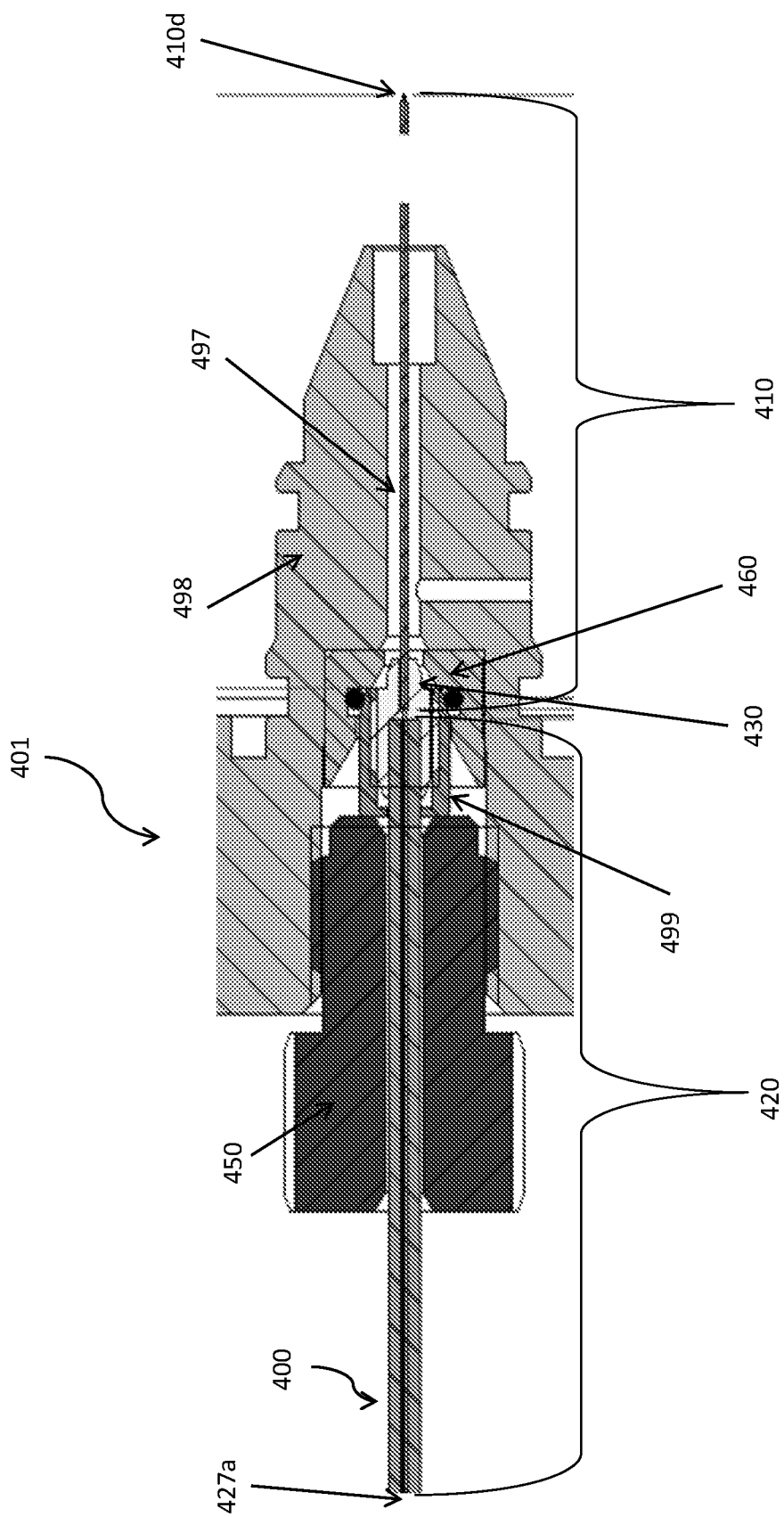
FIG. 4 is a cross-sectional schematic illustration of a probe that can be used for a multi-piece electrode electrospray ionization (ESI) according to various aspects of the applicant's teachings.

The emitter can be a one-piece electrode (FIG. 3) or multi-piece electrode (FIG. 4). The probe 401 can include a probe body 498 having a channel 497 extending therethrough through which an emitter 400 can be installed. The electrospray emitter 400 comprises an ionization segment 410 and a liquid conduit segment 420 formed using any suitable material, such as fused silica tubing or stainless steel. An insulating polymer, such as PEEK polymer, can be molded or extruded onto the liquid conduit segment 420 of the emitter 400. As noted above, the molding or extruding of the polymer onto the fused silica can be used to form a liquid connection to an LC column. The emitter 400 contains an axially depth location feature, a two-piece ferrule 430 and 499. The two piece ferrule performs two functions—the first enables the user to install the emitter tip accurately while the second functions as a union for the liquid conduit segment 420 and ionization segment 410 of the emitter. The two piece ferrule 430 and 499 is secured into place with the locating nut 450 as shown in FIG. 4 which aligns the emitter into place on the locating ferrule seat 460 without the need for any further adjustment by the user.

The molded or extruded PEEK covered fused silica can provide, on the liquid conduit segment 420, the practical OD for connecting to the LC column and receiving the fluid sample. For example, in one aspect, the liquid conduit segment can provide a tube having an outer diameter (OD) of about 1/32 or 1/16 inches or in a range from about 150 μm to about 1.6 mm for connecting to the LC column at an entrance end 427a of the emitter 400. The fused silica or stainless steel tubing can also provide, on the ionization discharge side 410d, the necessary ID for achieving the electrospray of the sample. The ID at the ionization discharge end 410d can be, for example, from about 10 μm to about 500 μm.

Figure 5:
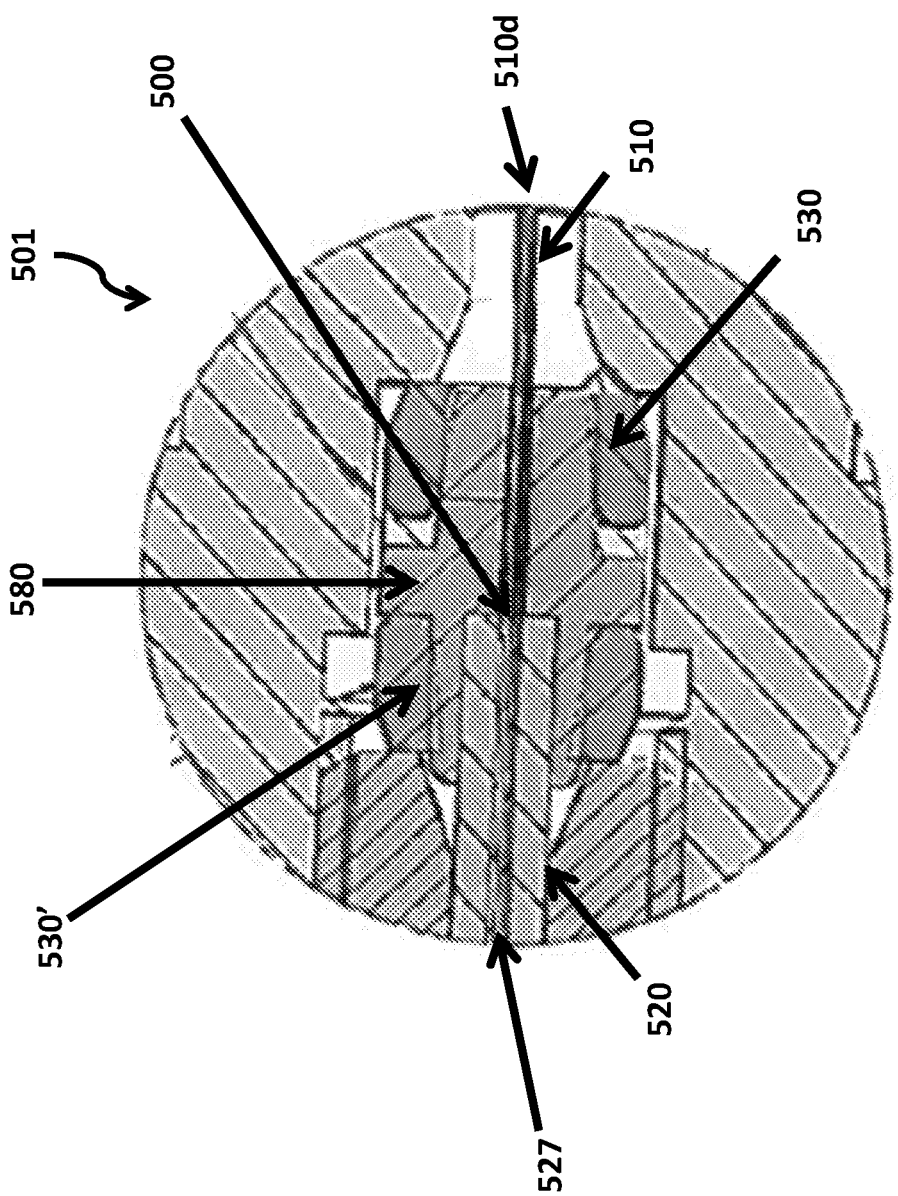
FIG. 5 is a cross-sectional detail of the schematic illustration of a probe that can be used for a multi-piece electrode electrospray ionization (ESI) according to various aspects of the applicant's teachings.

FIG. 5 is a cross-sectional schematic illustration of another integrated, monolithic multi-piece ESI probe 501 according to some embodiments disclosed herein. As shown in FIG. 5, the probe 501 can include an ionization discharge segment 510 and a fluid conduit segment 520 as discussed otherwise herein. The ionization discharge segment 510 and the fluid conduit segment 520 can be fluidly connected to form a channel that fluidly connects an LC column located at the fluid connection end 527 of the emitter 500 to an ionization discharge end 510d of the emitter 500.

As noted above, the fluid conduit segment 520 and the ionization discharge segment 510 of emitter 500 can be mechanically connected using any suitable means known in the art. For example, a clamp or locking rings 530, 530' can be used to mechanically connect and lock the two segments 510, 520 to one another within a ferrule or union 580. Further, as shown in FIG. 5, the emitter 500 can be configured to ensure accurate placement within ion source housing and (if present) within nebulization assisting gas nozzle. For example, the length of the emitter distal to the clamping ring 530 can be selected such that the emitter 500 extends an appropriate distance into the ionization chamber. Further, the locking rings 530, 530' can be configured such that they can lock the emitter ionization discharge segment 510 and the fluid conduit 520 with respect to one another within the ferrule 580 to prevent unwanted movement of the emitter ionization discharge segment 510 and the fluid conduit 520 with respect to one another.

Figure 6:
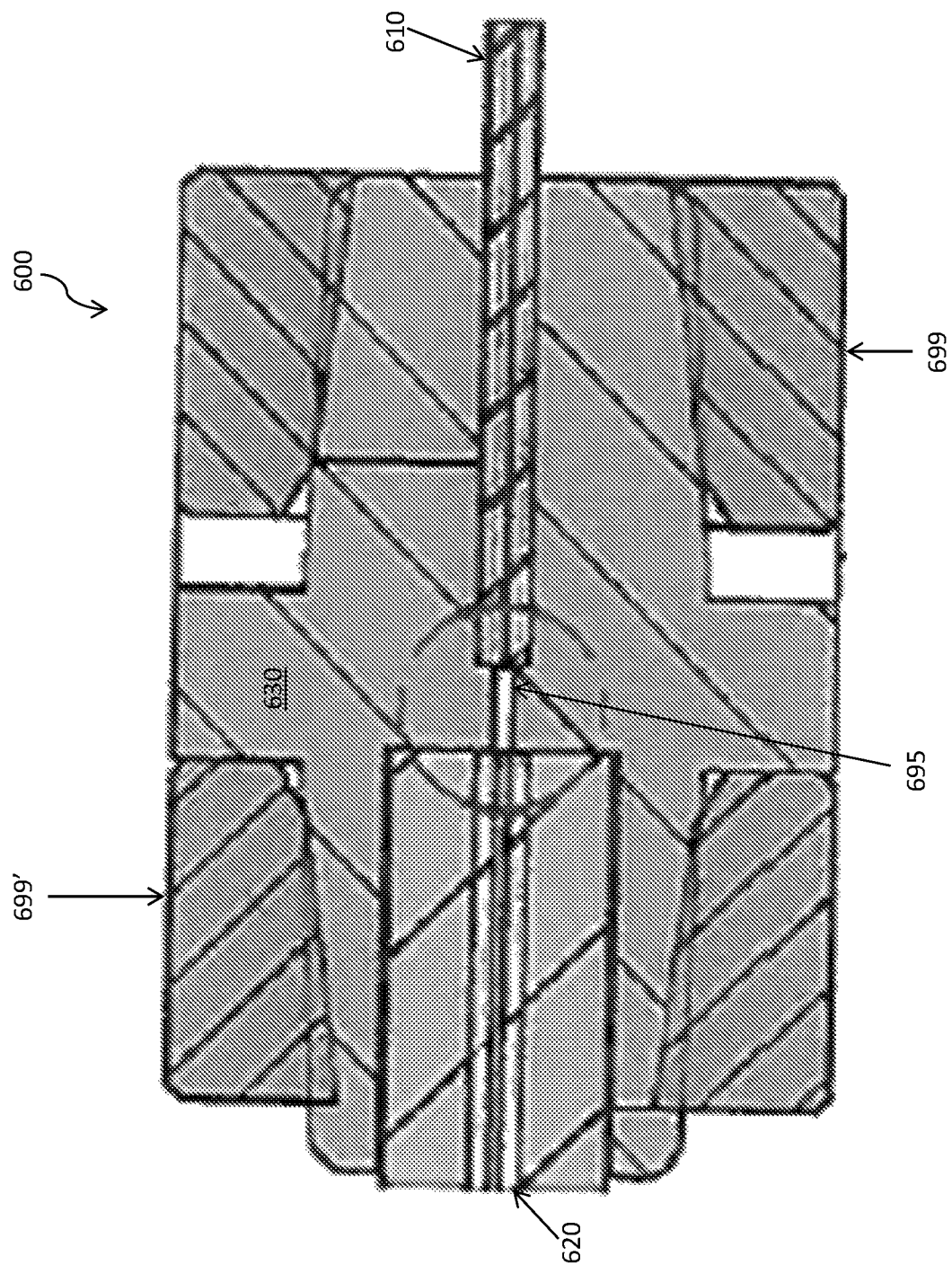
FIG. 6 is a cross-sectional detail of the schematic illustration of a probe that can be used for a multi-piece electrode electrospray ionization (ESI) according to various aspects of the applicant's teachings.

As noted above, a spray emitter according to various aspects described herein can comprise two or more pieces that have been connected to form an integrated monolithic electrospray emitter. FIG. 6 is a cross-sectional schematic illustration of a multi-piece electrode. ESI emitter 600 according to some aspects disclosed herein. As shown in FIG. 6, the emitter 600 can include two pieces 610, 620 that have been connected to form an integrated monolithic emitter 600. As discussed otherwise herein, the first segment 610 of the emitter 600 can be an ionization discharge segment and the other portion 620 of the emitter 600 can be a liquid conduit 620. The ionizing segment 610 can comprise any suitable material available in the art. For example, the ionizing segment 610 can be a sprayer tube that comprises a material such as fused silica or stainless steel.

The liquid conduit segment 620 can also comprise any suitable material known in the art. For example, the liquid conduit segment 620 can include one or more pieces of a material such as fused silica coated by another material such as PEEK.

The liquid conduit segment 620 and the ionization discharge segment 610 can be connected such that they form the integrated electrospray emitter 600. Specifically, once connected, the liquid conduit segment 620 and the ionization discharge segment 610 form a channel for creating a flow path from an LC column (e.g., LC column 127 of FIG. 1) to the discharge end of the emitter.

Generally, any suitable means available in the art can be used to connect the liquid conduit segment 620 and the ionization discharge segment 610. For example, as shown in FIG. 6, the liquid conduit segment 620 and the ionization discharge segment 610 can be fluidly connected through a fluid pathway 695. The fluid pathway 695 can be formed from any suitable material available in the art. For example, the fluid pathway 695 can be made from a deformable or a non-deformable material (e.g., stainless steel). Further, as noted above, the liquid conduit segment 620 and the ionization discharge segment 610 can also be mechanically connected to one another through a two piece ferrule connector 630 and 699, 699'. The mechanical connection can be established using any suitable means available in the art. By way of non-limiting example, in some aspects, the mechanical connection 630 and 699, 699' can be established using a polychlorotrifluoroethylene (commonly known as Kel-F) ferrule. Additionally or alternatively, in certain embodiments, the connection 630 and 699, 699' can be established using a non-deformable material, such as stainless steel, or a deformable material, such as PEEK. A deformable connection can be secured via the compression of the ferrule 630 using a two piece locating compression ring 699, 699' that surrounds the fluid conduit 620 and ionization discharge segment 610. Further, as shown in FIG. 6, the emitter 600 can be configured to ensure accurate placement within the ion source housing and (if present) within the nebulization assisting gas nozzle. The length of the emitter distal to the two-piece ferrule 630 and 699, 699' can be selected such that the emitter 600 extends an appropriate distance into the ionization chamber. Further, the locating rings 630, 699, 699' can be configured such that they can position the emitter ionizing discharge segment 610 within an ESI probe to prevent unwanted movement of the emitter ionizing discharge segment 610.

It should be appreciated that for clarity, the above discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The above detailed description of embodiments is not to be regarded as limiting the scope of the applicant's teachings in any manner. As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially equal" as used herein means greater or lesser than the value or range of values stated by $\frac{1}{10}$ of the stated values, e.g., ±10%. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

Those having ordinary skill in the art will appreciate that various changes can be made to the above embodiments without departing from the scope of the invention. All such modifications or variations are believed to be within the sphere and scope of the applicants' teachings as defined by the claims appended hereto.

What is claimed is:

1. An electrospray ionization emitter comprising:
    an emitter body comprising fused silica, the emitter body comprising:
        a fluid conduit segment having a liquid connection end, the liquid connection end being coated with polyetheretherketone (PEEK) on at least one portion thereof and having a first outer diameter configured for connecting to a sample source and receiving a sample liquid for ionization therefrom; and
        an ionization discharge segment fluidly connected to the fluid conduit segment, the ionization discharge segment having an ionization discharge end, the ionization discharge end being coated with a conductive material on at least one portion thereof and having a second outer diameter configured to allow ionization of the liquid sample, wherein the second outer diameter is smaller than the first outer diameter.

2. The electrospray ionization emitter of claim 1, wherein the fluid conduit segment comprises a reinforcement coating on the at least one portion thereof, the reinforcement coating being configured to facilitate coating of the at least one portion of the fluid conduit segment with PEEK.

3. The electrospray ionization emitter of claim 2, wherein the reinforcement coating comprises polyimide.

4. The electrospray ionization emitter of claim 1, wherein the ionization discharge end is configured to allow electrostatic field effect.

5. The electrospray ionization emitter of claim 1, wherein the ionization discharge end comprises a pretreated surface that is configured to improve coating of the ionization discharge end with the conductive material.

6. The electrospray ionization emitter of claim 5, wherein the ionization discharge end is subjected to ion bombardment by at least one of Argon, Oxygen, or Neon ions to form the pretreated surface.

7. The electrospray ionization emitter of claim 1, wherein the emitter body includes at least one of a permanently non-deformable and a deformable mechanical connection that fluidly couples the fluid conduit segment and the ionization discharge segment.

8. The electrospray ionization emitter of claim 7, wherein the mechanical connection is established using at least one of a clamp or a ferrule.

9. The electrospray ionization emitter of claim 8, wherein a position of the at least one clamp and ferrule can be adjusted prior to permanently forming the mechanical connection to ensure accurate positioning of the ionization discharge end within an ionization chamber.

10. The electrospray ionization emitter of claim 1, wherein the emitter body includes an electrical insulating material on at least a portion of the fluid conduit segment to allow for handling of the emitter by a user.

11. The electrospray ionization emitter of claim 1, wherein the emitter body includes locating ring to ensure accurate placement within an ion source housing and if present within a nebulizing gas nozzle.

12. The electrospray ionization emitter of claim 1, further comprising a deformable O-ring to provide nebulizing gas seal for pneumatically assisted electrospray operation.

13. A method for manufacturing an electrospray ionization emitter, the method comprising:
    connecting a fluid conduit segment, having a liquid connection end, to an ionization discharge segment, having an ionization discharge end, to form a body for the emitter, the emitter body comprising fused silica;
    coating the liquid connection end with polyetheretherketone (PEEK) on at least one portion thereof to form a first outer diameter at the liquid connection end that allows the liquid connection end to be connected to a sample source to receive a sample liquid for ionization therefrom; and
    coating the ionization discharge end of the ionization discharge segment with a conductive material on at least one portion thereof, the ionization discharge end having a second outer diameter configured to allow ionization of the liquid sample.

14. The manufacturing method of claim 13, further comprising coating the fluid conduit segment with a reinforcement coating on the at least one portion thereof, the reinforcement coating being configured to facilitate coating of the at least one portion of the fluid conduit segment with PEEK.

15. The manufacturing method of claim 14, wherein the reinforcement coating comprises polyimide.

16. The manufacturing method of claim 13, further comprising forming the ionization discharge end to allow electrostatic field effect.

17. The manufacturing method of claim 13, further comprising pretreating a surface of the ionization in order to improve coating of the ionization discharge end with the conductive material.

18. The manufacturing method of claim 17, further comprising pretreating the ionization discharge end by subjecting the ionization discharge end to ion bombardment by at least one of Argon, Oxygen, or Neon ions to form the pretreated surface.

19. The manufacturing method of claim 13, further comprising permanently forming a mechanical connection between the fluid conduit segment and the ionization discharge segment.

20. The manufacturing method of claim 19, wherein the mechanical connection between the fluid conduit segment and the ionization discharge segment comprises using at least one of a clamp or a ferrule.

21. The manufacturing method of claim 20, further comprising adjusting the position of the mechanical connection prior to permanently forming the mechanical connection to ensure accurate placement of the emitter discharge segment within an ionization chamber.

22. The manufacturing method of claim 13, further comprising insulating at least a portion of the fluid conduit segment with an electrical insulating material to allow for handling of the emitter by a user.

23. The manufacturing method of claim 13, further comprising locating ring to ensure accurate placement within an ion source housing and if present within a nebulizing gas nozzle.

24. The manufacturing method of claim 13, further comprising a deformable O-ring to provide nebulizing gas seal for pneumatically assisted electrospray operation.

* * * * *